Patented Jan. 28, 1941

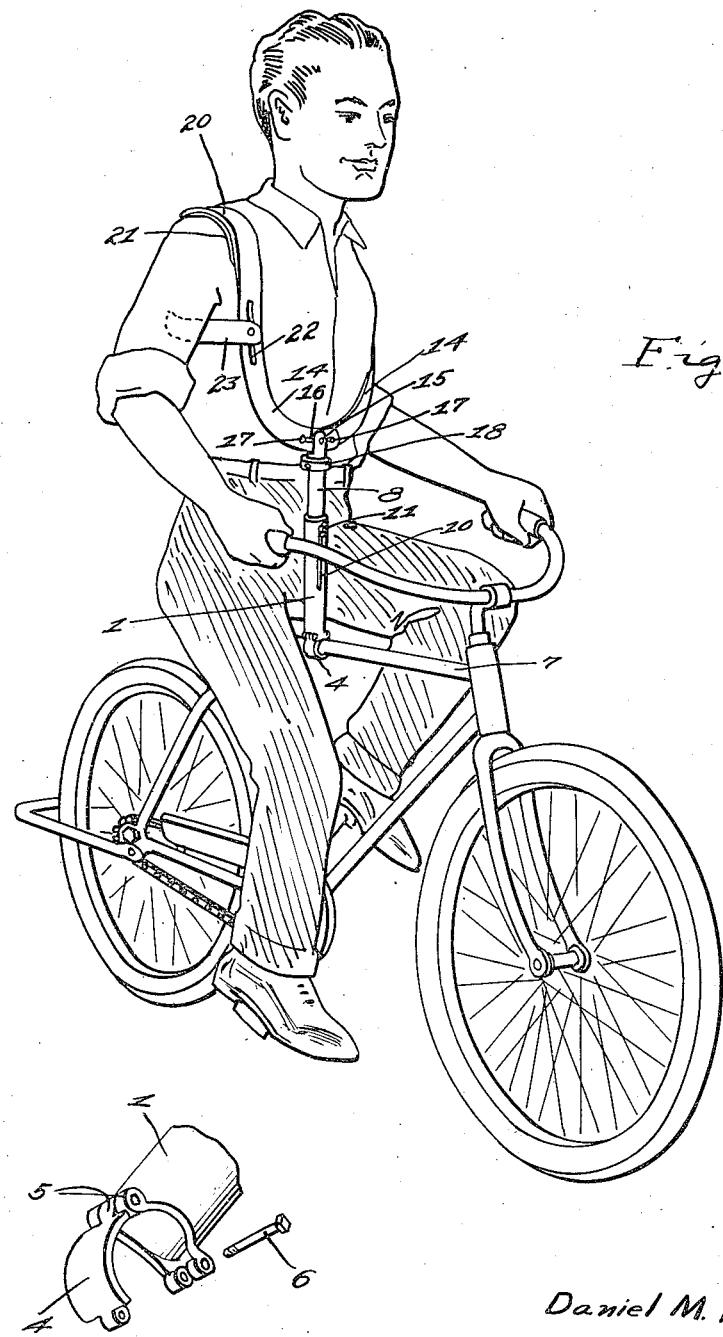

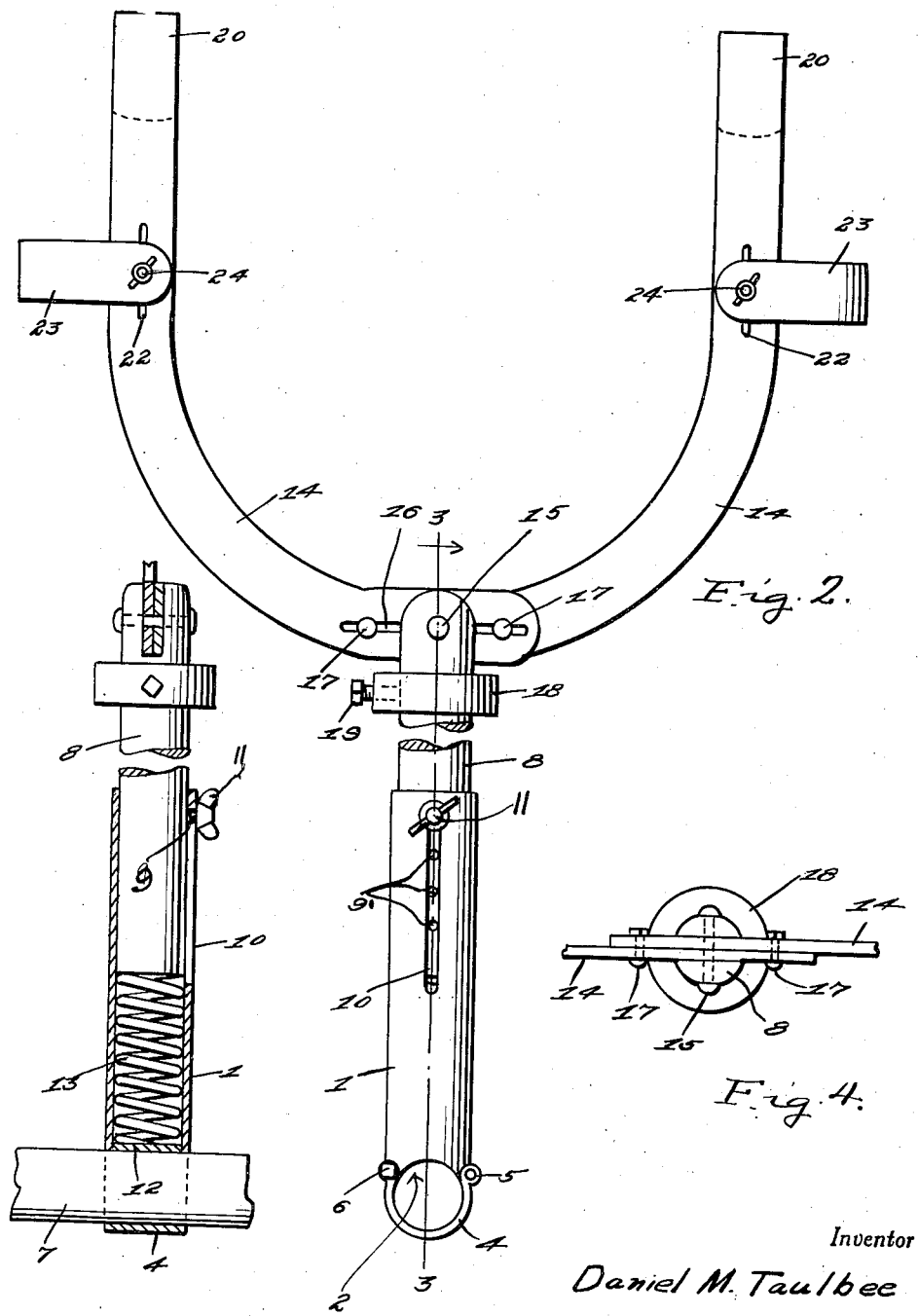

2,229,778

UNITED STATES PATENT OFFICE 2,229,778

SHOULDER BRACE FOR BICYCLE RIDING

Daniel M. Taulbee, Lejunior, Ky.

Application September 5, 1940, Serial No. 355,504

1 Claim. (Cl. 280—290)

This invention relates to a shoulder brace for bicycle riders, the general object of the invention being to provide an attachment for the bicycle which has means for engaging the shoulders of the rider so as to eliminate fatigue as it helps the rider to hold a restful position on the bicycle.

Another object of the invention is to provide means for adjusting the device to suit different sizes of riders.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which—

Figure 1 is a view showing the invention in use.

Figure 2 is a front view of the device itself.

Figure 3 is a section on the line 3—3 of Figure 2.

Figure 4 is a fragmentary top plan view showing how the curved members are connected with the top of the rod.

Figure 5 is a fragmentary view showing the clamp means for attaching the device to a frame part of the bicycle.

In these views the member 1 indicates a tubular member which has a substantially semi-circular recess 2 in its lower end and a substantially semi-circular clamp 4 is hinged to one edge part of the member 1 at the lower end thereof as shown at 5 and the other end of the clamp is adapted to be connected to the opposite side edge portion of the member 1 by a bolt 6. These parts are so arranged that when the lower end of the member 1 is placed on a top bar 7 of a bicycle and the clamp 4 fastened by the bolt 6 to the lower end of the tubular member said member will be held in vertical position on the bar 7, as shown in Figure 1. A rod 8 has a sliding fit in the tubular member and a bolt 9 is carried by the rod and passes through a longitudinally extending slot 10 in the tubular member 1 and has a winged head 11. Rod 8 has a row of holes 9' therein for receiving the bolt so that the tension of the spring can be adjusted by placing the bolt in the proper hole. This bolt limits upward movement of the rod. The lower end of the tubular member is closed by a plate 12, see Figure 3, and a coil spring 13 is placed in the tubular member and has its lower end resting upon the plate 12 and its upper end against the end of the rod 8.

The upper end of the rod is of forked construction and the lower ends of the curved members 14 pass between the prongs of this forked upper end and overlap each other and these ends are pivoted in the space between the prongs by a rivet or bolt 15. These overlapping ends are provided with slots 16 through which the member 15 passes and bolts 17 pass through end portions of the slots so that the members 14 can be adjusted toward and away from each other to suit the size of the rider using the device. A collar 18 is adjustably held on the upper end of the rod 8 by a set screw 19 and this collar limits the outward rocking movement of the two members 14 on the member 15. These members 14 curve upwardly and outwardly and have substantially straight upper portions with their upper ends curving rearwardly as shown at 20 to engage the shoulders of a rider, as shown in Figure 1. The under faces of these curved parts 20 are lined with suitable material as shown at 21. Longitudinally extending slots 22 are formed in the intermediate straight portions of the members 14 and outwardly curved bars 23 are adjustably held to these parts by the bolts and nuts shown generally at 24, the bolts passing through the slots 22. These bars 23 pass under the arms of the rider and are but slightly curved so as to give free movement to the body and to leave the arms free.

As will be seen the device is adjustable vertically to suit the height of the rider and the members 14 can be adjusted toward and away from each other to suit the width of the rider. It will also be seen that the device will move with the movements of the rider as he is propelling the bicycle.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

An attachment for a bicycle comprising a vertically arranged member, means for clamping the same to the top bar of a bicycle frame, a second vertically arranged member telescopically connected with the first member, spring means tending to force the second member upwarldy, a pair of shoulder engaging members having inwardly and downwardly curved lower ends pivotally connected with the upper end of the second telescopic member, said members having their upper ends curving rearwardly to fit over the shoulders of a rider, means for adjustably connecting the lower ends of said members to the upper end of the telescopic member for permitting said members to be moved toward and away from each other and body engaging plates adjustably connected with intermediate parts of the members and passing under the arms of the rider.

DANIEL M. TAULBEE.